United States Patent
Choi et al.

(10) Patent No.: US 9,307,446 B2
(45) Date of Patent: Apr. 5, 2016

(54) METHOD AND APPARATUS FOR DISTRIBUTING LOAD IN WIRELESS COMMUNICATION SYSTEM

(71) Applicant: Samsung Electronics Co., Ltd., Gyeonggi-do (KR)

(72) Inventors: Jung-Min Choi, Seoul (KR); Dae-Joong Kim, Gyeonggi-do (KR); Jeong-Jae Won, Gyeonggi-do (KR); Hwa-Jin Cha, Gyeonggi-do (KR); Han-Seok Kim, Seoul (KR); Seong-Ryong Kang, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 55 days.

(21) Appl. No.: 13/707,062

(22) Filed: Dec. 6, 2012

(65) Prior Publication Data

US 2014/0098670 A1  Apr. 10, 2014

(30) Foreign Application Priority Data

Oct. 9, 2012 (KR) .................. 10-2012-0111909

(51) Int. Cl.
| | | |
|---|---|---|
| H04L 1/00 | (2006.01) | |
| H04W 28/08 | (2009.01) | |
| H04L 5/00 | (2006.01) | |
| H04W 36/22 | (2009.01) | |
| H04W 88/08 | (2009.01) | |

(52) U.S. Cl.
CPC ............. *H04W 28/08* (2013.01); *H04L 5/00* (2013.01); *H04W 36/22* (2013.01); *H04W 88/08* (2013.01)

(58) Field of Classification Search
CPC ..... H04W 28/08; H04W 36/22; H04W 36/06; H04W 36/0083; H04L 43/0882; H04L 43/16; H04L 47/125; H04L 47/11
USPC .......................................................... 370/235
See application file for complete search history.

(56) References Cited

U.S. PATENT DOCUMENTS

| | | | | |
|---|---|---|---|---|
| 8,180,362 | B1 * | 5/2012 | Fong et al. ................... | 455/453 |
| 8,731,557 | B2 * | 5/2014 | Svedevall et al. ............ | 455/436 |
| 2011/0002276 | A1 * | 1/2011 | Chen et al. ................... | 370/329 |
| 2011/0171952 | A1 * | 7/2011 | Niu ............................ | 455/422.1 |
| 2012/0009972 | A1 * | 1/2012 | Viering et al. ............... | 455/525 |
| 2012/0014357 | A1 * | 1/2012 | Jung et al. ................... | 370/332 |
| 2012/0057547 | A1 * | 3/2012 | Lohr et al. ................... | 370/329 |
| 2012/0224484 | A1 * | 9/2012 | Babiarz et al. ............... | 370/235 |
| 2012/0287869 | A1 * | 11/2012 | Xi et al. ...................... | 370/329 |

* cited by examiner

*Primary Examiner* — Alpus H Hsu
*Assistant Examiner* — Elton Williams
(74) *Attorney, Agent, or Firm* — The Farrell Law Firm, P.C.

(57) ABSTRACT

A method and an apparatus for distributing a load of a base station in a wireless communication system supporting multi-carriers are provided. In the method, carriers are classified into a plurality of groups. A load of each of a plurality of cells corresponding to the plurality of groups, is determined. A cell load of each of the plurality of cells is compared with at least one threshold set in advance. When a cell load of a first cell has a value greater than the at least one threshold set in advance, a cell inside a group of the first cell or a cell inside a group different from the first cell is selected depending on the cell load of the first cell. A terminal of the first cell is allowed to perform a handover to the selected cell.

18 Claims, 13 Drawing Sheets

METHOD AND APPARATUS FOR DISTRIBUTING LOAD IN WIRELESS COMMUNICATION SYSTEM

PRIORITY

This application claims priority under 35 U.S.C. §119(a) to a Korean patent application filed in the Korean Intellectual Property Office on Oct. 9, 2012 and assigned Serial No. 10-2012-0111909, the entire disclosure of which is hereby incorporated by reference.

BACKGROUND OF THE INVENTION

1. Field of the Invention

The present invention generally relates to a method and an apparatus for distributing a load in a wireless communication system.

2. Description of the Related Art

Generally, load distribution or load balancing is important in computer network technology, and denotes optimizing availability of a computer resource and a response time to a request by distributing jobs to a plurality of computer resources. Such load distribution is used in various fields, and recently, a study for load distribution between base stations or a load scheme between terminals in a wireless communication system has been undertaken.

Also, recently, interest in a Long Term Evolution (LTE) system supporting a multi-carrier to transmit high capacity data in high speed rapidly has increased. However, a standard of the LTE system only specifies load information to be exchanged between base stations for load distribution between base stations, and specifies that a terminal is allowed to perform a handover to distribute a load, but does not specify a method in which a load is distributed. Therefore, a method for distributing a load between multi-carriers in a wireless communication system supporting multi-carriers is needed.

SUMMARY OF THE INVENTION

An aspect of the present invention is to address at least the above-mentioned problems and/or disadvantages and to provide at least the advantages described below. Accordingly, an aspect of the present invention is to provide a method and an apparatus for classifying multi-carriers to a plurality of groups and distributing a load based on the classified group in a wireless communication system supporting the multi-carriers.

Another aspect of the present invention is to provide a method and an apparatus for distributing a load for a plurality of multi-carriers existing in the same position inside a group in a wireless communication system supporting multi-carriers.

Still another aspect of the present invention is to provide a method and an apparatus for allocating multi-carriers of a neighbor sector inside a group in a wireless communication system supporting multi-carriers.

Yet another aspect of the present invention is to provide a method and an apparatus for distributing a load between groups in a wireless communication system supporting multi-carriers.

A further aspect of the present invention is to provide a method and an apparatus for distributing a load using a cell load based on an available resource in a wireless communication system supporting multi-carriers.

Yet another aspect of the present invention is to provide a method and an apparatus for distributing a load using a cell load that considers the number of active terminals in a wireless communication system supporting multi-carriers.

Still yet another aspect of the present invention is to provide a method and an apparatus for allowing each base station to exchange load distribution information of a neighbor base station and a serving cell, and distribute a load inside a group and/or between groups based on the exchanged load information.

In accordance with an aspect of the present invention, a method for distributing a load of a base station in a wireless communication system supporting multi-carriers is provided. The method includes classifying a plurality of carriers into a plurality of groups, determining a load of each of a plurality of cells corresponding to the plurality of carriers, comparing a cell load of each of the plurality of cells with at least one threshold set in advance, when a cell load of a first cell has a value greater than the at least one threshold set in advance, selecting a cell inside a group of the first cell or a cell inside a group different from the first cell depending on the cell load of the first cell, and allowing a terminal of the first cell to perform a handover to the selected cell.

In accordance with another aspect of the present invention, an apparatus for distributing a load of a base station in a wireless communication system supporting multi-carriers is provided. The apparatus includes a transceiver for transmitting/receiving a signal, and a controller for controlling functions for classifying a plurality of carriers into a plurality of groups, determining a load of each of a plurality of cells corresponding to the plurality of groups, comparing a cell load of each of the plurality of cells with at least one threshold set in advance, when a cell load of a first cell has a value greater than the at least one threshold set in advance, selecting a cell inside a group of the first cell or a cell inside a group different from the first cell depending on the cell load of the first cell, and allowing a terminal of the first cell to perform a handover to the selected cell.

BRIEF DESCRIPTION OF THE DRAWINGS

The above and other aspects, features and advantages of certain embodiments of the present invention will be more apparent from the following detailed description taken in conjunction with the accompanying drawings, in which.

Throughout the drawings, like reference numerals will be understood to refer to like parts, components and structures.

DETAILED DESCRIPTION OF EMBODIMENTS OF THE PRESENT INVENTION

The following description with reference to the accompanying drawings is provided to assist in a comprehensive understanding of embodiments of the invention as defined by the claims and their equivalents. It includes various specific details to assist in that understanding but these are to be regarded merely as examples. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to their dictionary meanings, but, are merely used to enable a clear and consistent understanding of the invention. Accordingly, it should be apparent to those skilled in the art that the following description of embodiments of the present invention are provided for illustration purposes only and not for the purpose of limiting the invention as defined by the appended claims and their equivalents.

Embodiments of the present invention provide a technology for classifying multi-carriers into a plurality of groups, and performing classified group-based load distribution in a wireless communication system supporting multi-carriers. Hereinafter, for convenience in description, the present invention is described in conjunction with an LTE system. However, the present invention is applicable to all systems supporting multi-carriers.

Figure 1:
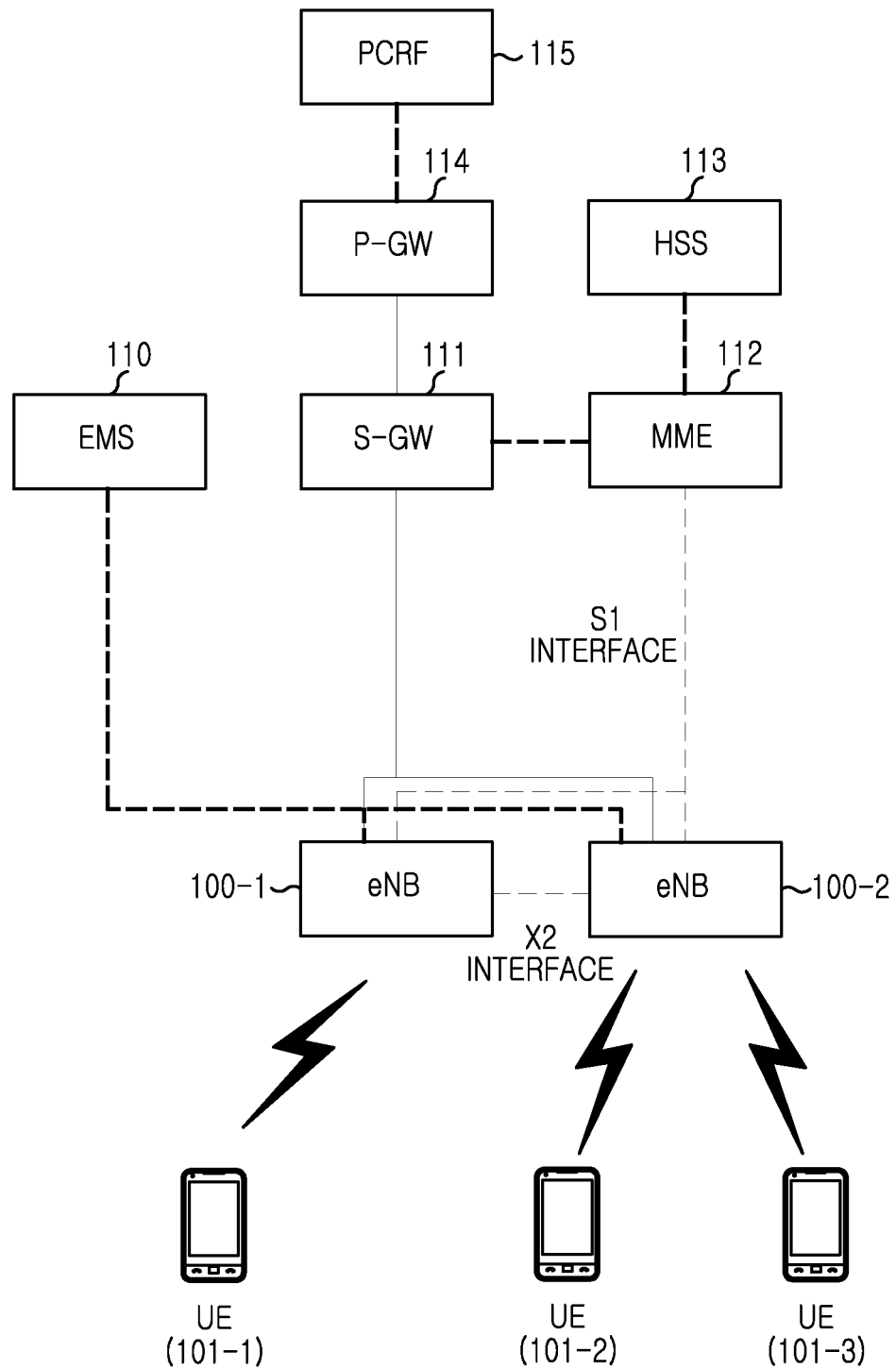
FIG. 1 is a block diagram illustrating a wireless communication system according to an embodiment of the present invention.

FIG. 1 illustrates a wireless communication system according to an embodiment of the present invention.

Referring to FIG. 1, the wireless communication system includes a plurality of Evolved UTRAN Node-Bs (eNBs) 100-1 and 100-2 (referred to as 'base stations' hereinafter), an Element Management System (EMS) 110, a Serving Gateway (S-GW) 111, a Mobility Management Entity (MME) 112, a Home Subscriber Server (HSS) 113, a PDN Gateway (P-GW) 114, and a Policy Charging & Rule Function (PCRF) 115.

The base stations 100-1 and 100-2 are wirelessly connected with one or more User Equipments (UE) 101-1 to 101-3 to process a call, and perform various functions including transmitting/receiving a radio signal, a function of modulating/demodulating packet traffic, a wireless resource control function, etc.

The base stations 100-1 and 100-2 according to the present invention measure load information of a cell corresponding to each of a plurality of carriers supported by the base stations 100-1 and 100-2, and exchange the measured load information of each cell with neighbor base stations via an X2 interface. The base stations 100-1 and 100-2 perform a function for distributing a load of a cell based on a multi-carrier group set in advance depending on the measured load of each cell. Here, the multi-carrier group may be classified depending on a purpose of each carrier, a company code corresponding to each carrier, and a company policy.

Particularly, the base stations 100-1 and 100-2 according to the present invention determine a load distribution method based on a cell load corresponding to each carrier. The present invention provides three load distribution methods. A first method distributes a load to a cell corresponding to a co-located different carrier inside the same group. That is, in the case where a load of a specific cell exceeds a threshold load, the first method selects a cell whose load is different from the cell load of the specific cell by a threshold value and is lowest among co-located cells that belong to the same group as the specific cell, and allows a terminal of the specific cell to perform a handover to the selected cell. Hereinafter, for convenience in description, the first method is referred to as a load equalization method inside a group.

A second method distributes a load to a cell corresponding to a co-located different carrier inside a group or corresponding to the same or a different carrier of a different position inside a group. That is, in the case where a load of a specific cell exceeds a threshold load, the second method selects a cell whose load is lower than an object load and is lowest among neighbor cells that belong to the same group as the specific cell, and allows a terminal of the specific cell to perform a handover to the selected cell. Hereinafter, for convenience in description, the second method is referred to as an offloading method inside a group.

A third method denotes a method for distributing a load to a cell corresponding to a carrier that belongs to a different group. That is, in the case where a load of a specific cell exceeds a threshold load, the third method selects a cell whose load is lower than an object load and is lowest among neighbor cells that belong to a group different from the specific cell, and allows a terminal of the specific cell to perform a handover to the selected cell. Hereinafter, for convenience in description, the third method is referred to as an intragroup off loading method.

Here, according to an embodiment of the present invention, the threshold load (equal threshold) of the first method should be less than the threshold load (offload threshold) of the second method (equal threshold<offload threshold), and the threshold load of the second method should be less than the threshold load (intragroup offload threshold) of the third method (offload threshold<intragroup offload threshold). The object load (first object load) of the second method and the object load (second object load) of the third method should be set lower than an offload threshold inside a group, which is the threshold load of the second method (first object load, second object load<off load threshold inside a group). Here, the first object load and the second object load may be the same value or different values.

Figure 2:
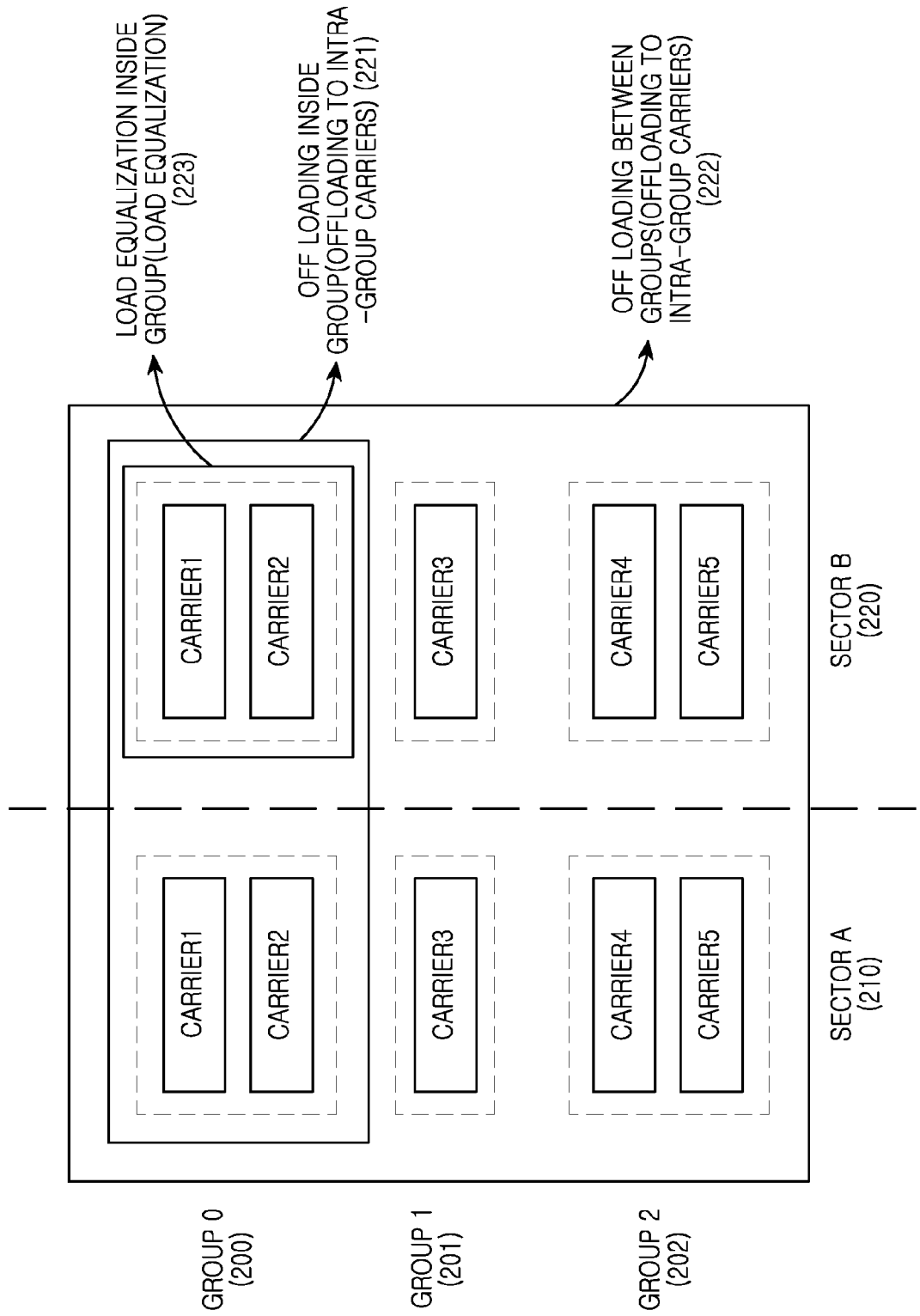
FIG. 2 illustrates a group-based load distribution method in a wireless communication system according to an embodiment of the present invention.

For example, as illustrated in FIG. 2, with an assumption that cells corresponding to a carrier 1 to a carrier 5 exist with respect to each of a sector A 210 and a sector B 220 and the carrier 1 and the carrier 2 are classified into a group 0 200, the carrier 3 is classified into a group 1 201, and the carrier 4 and the carrier 5 are classified into a group 2 202, the three load distribution methods are described. Also, for convenience in description, it is assumed that the sector A 210 and the sector B 220 belong to one base station. However, the sector A 210 and the sector B 220 may belong to different base stations, respectively, depending on a design scheme, and even the same sector may belong to different base stations for each carrier.

In the case where a cell load of a cell corresponding to the carrier 1 of the sector B 220 exceeds an equal threshold set in advance, a base station determines to perform the load equalization inside the group (223). Accordingly, the base station selects a cell belonging to the group 0 and corresponding to the carrier 2 located in the same sector B 220, and determines whether a cell load of the selected cell is different from a cell load of a cell corresponding to the carrier 1 by a threshold or more. When the cell load of the selected cell is different by the threshold or more, the base station determines the cell corresponding to the carrier 2 as a target cell. After that, the base station allows a terminal that receives a service from the cell corresponding to the carrier 1 to perform a handover to the target cell.

In the case where the cell load of the cell corresponding to the carrier 1 of the sector B 220 exceeds the offload threshold inside the group set in advance, the base station determines to perform the offloading inside the group (221). Accordingly, the base station determines a cell (i.e., a cell corresponding to the sector A 210 of the group 1 and the carrier 1) whose cell load is lower than the first object load and is lowest among all cells belonging to the group 0; that is, a cell corresponding to the carrier 2 located in the same sector B 220 and cells corresponding to the carrier 1 and the carrier 2 located in the sector A 210, as a target cell. After that, the base station allows the terminal that receives a service from the cell corresponding to the carrier 1 to perform a handover to the target cell.

In the case where the cell load of the cell corresponding to the carrier 1 of the sector B 220 exceeds the intragroup offload threshold set in advance, the base station determines to perform the intragroup offloading (222). Accordingly, the base station determines a cell (i.e., cell corresponding to the sector A 210 of the group 1 and the carrier 3) whose cell load is lower than the second object load and is lowest among all cells belonging to the group 1 and the group 2 as a target cell. After that, the base station allows the terminal that receives a service from the cell corresponding to the carrier 1 to perform a handover to the target cell.

Referring back to FIG. 1, the EMS 110 provides an interface of an operator matching function so that an operator may perform an operation and maintenance on an eNB, and provides functions of software management, configuration management, performance management, and a disorder management.

The S-GW 111 serves as an anchor of a user plane between a 2G/3G access system and an LTE system, and manages and changes a packet transmission layer of downlink and uplink data.

The MME 112 processes a control message using a Non-Access Stratum (NAS) signaling protocol with the base stations 100-1 and 100-2, and performs functions that include mobility management, tracking area list management, bearer and session management for a terminal, etc.

The HSS 113 is a database managing system for storing and managing parameters and position information of all mobile subscribers. The HSS 113 manages important data such as an access ability of a mobile subscriber, a basic service, an additional service, etc., and performs a routing function for a called subscriber.

The P-GW 114 allocates an IP address to UE, serves as an anchor for mobility between an LTE system and a non-3GPP access system, and manages billing and a transmission rate depending on a service level.

The PCRF 115 generates a policy rule for dynamically applying a Quality of Service (QoS) and a billing policy differentiated for each service flow, or generates a policy applicable to a plurality of service flows in common.

Figure 3:
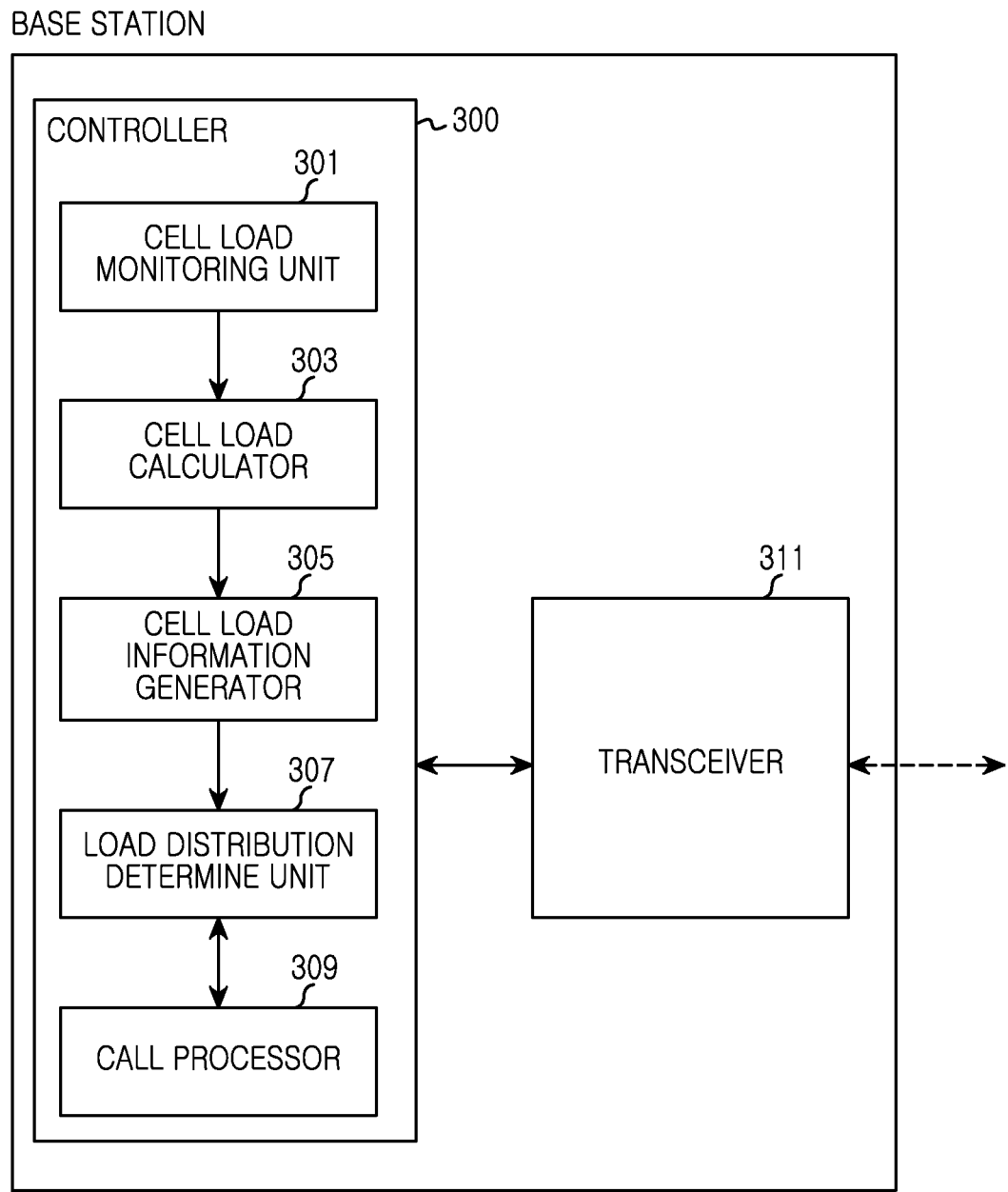
FIG. 3 is a block diagram illustrating a base station in a wireless communication system according to an embodiment of the present invention.

FIG. 3 illustrates a base station in a wireless communication system according to an embodiment of the present invention.

Referring to FIG. 3, the base station includes a controller 300 and a transceiver 311. Particularly, the controller 300 includes a cell load monitoring unit 301, a cell load calculator 303, a cell load information generator 305, a load distribution determining unit 307, and a call processor 309.

The controller 300 measures load information of a cell corresponding to each of a plurality of carriers supported by the base station, and then exchanges the measured load information of each cell with neighbor base stations, and distributes a load of a cell based on the measured and exchanged cell load information of each cell and a multi-carrier group set in advance. Here, the multi-carrier group may be classified depending on a purpose of each carrier, a company corresponding to each carrier, and a company policy.

The cell load monitoring unit 301 periodically collects and measures parameter information required for generating a cell load of a plurality of cells corresponding to each multi-carrier supported by the base station. For example, the cell load monitoring unit 301 collects or measures a hardware load (such as a CPU use rate), S1 Transport Network Layer (TNL) load (such as a backhaul use rate), Guaranteed Bit Rate Physical Resource Block (GBR PRB) use rate, a non-GBR PRB use rate, and an entire PRB use rate. Here, the cell load monitoring unit 301 may collect or measure a cell load every period set in advance or every event occurrence point set in advance.

As defined by a standard, the cell load calculator 303 calculates a cell capacity class value representing a relative capacity of a cell, and a cell capacity value representing a capacity usable for load distribution among an entire cell capacity with respect to each of a plurality of cells supported by the base station based on the parameter information collected by the cell load monitoring unit 301. Particularly, according to the present invention, the cell load calculator 303 calculates a representative cell load and an absolute cell capacity using Equation (1) to Equation (4) below based on the collected parameter information.

In detail, the cell load calculator 303 calculates an average air resource for non-GBR service allocatable to a UE which will newly enter a cell, that is, an available air resource with respect to each of the plurality of cells. At this point, the available air resource may be calculated for each of a downlink and an uplink and may be calculated with consideration of an air resource currently not in use and an air resource allocatable to a UE which will newly enter a cell in the case where the UE which will newly enter is equally allocated resources for non-GBR service with existing UEs which have received a service already.

Equation (1) represents a method for calculating an available air resource.

$$C\_PRB^k_{XL} = \max\left\{ PRB^k_{XL,unused}(t), \frac{PRB^k_{XL,unused}(t) + \beta \cdot PRB^k_{XL,nonGBR}(t)}{1 + N^k_{QoS,UE}(t)} \right\} \quad (1)$$

where XL is an uplink (UL) or a downlink (DL), k is a cell index, and $C\_PRB^k_{XL}$ is an uplink or downlink available air resource. Also, $PRB^k_{XL,unused}(t)$ is an average unused rate of PRB for a period t, $PRB^k_{XL,nonGBR}(t)$ is an average use rate of non-GRB for a period t, and β is a coefficient between 0 and 1. Also, $N^k_{QoS,UE}(t)$ is the number of UEs for a period t and may be calculated using Equation (2).

Therefore, in Equation (1), the left parameter $PRB^k_{XL,unused}(t)$ of max { } may represent an air resource currently not in use, and the right parameter $$\frac{PRB^k_{XL,unused}(t) + \beta \cdot PRB^k_{XL,nonGBR}(t)}{1 + N^k_{QoS,UE}(t)}$$

may denote an air resource allocatable to a UE which will newly enter the cell in the case where the UE which will newly enter is equally allocated resources for non-GBR service with existing UEs which have received a service already.

Equation (2) represents a method for calculating $N^k_{QoS,UE}(t)$.

$$N^k_{QoS,UE}(t) = \{a \cdot N_{gold,UE} + b \cdot N_{silver,UE} + N_{bronze,UE}, \text{ if UE QoS class considered } N_{UE}, \text{ else}\} \quad (2)$$

where $N_{UE}$ is the number of all UEs for which an RRC connection has been performed on a relevant cell, gold, silver, and bronze denote a user service class, and 'a' and 'b' are a value greater than or equal to 1 and denote a coefficient determined depending on a user service class.

That is, the cell load calculator 303 may calculate $N^k_{QoS,UE}(t)$ representing the number of UEs for a period t in consideration of a service class of each UE, and may calculate $N^k_{QoS,UE}(t)$ without in consideration of a service class of each UE.

When an available air resource is determined based on Equation (1) and Equation (2), the cell load calculator 303 calculates a representative available resource using Equation (3). Parameters represented in Equation (3) are parameters collected or measured for a period t with respect to a cell k, but expressions for the period t and the cell k are omitted for convenience in description.

$$\text{if } N_{UE} \geq \alpha \cdot N_{Max} 0, \{\text{or if } CPU_{Load} > \text{Threshold}_{CPU} C_{XL} = \{\text{or if max } \{B_{unused}, (B_{unused} + B_{nonGBR})/(1 + N_{QoS,UE}) \leq \text{Min}_{BHuser}\} \quad (3)$$

$C\_PRB_{XL}$, otherwise where $C_{XL}$ is a representative available resource of an uplink or a downlink, $N_{Max}$ is the number of RRC connected all UEs, $\alpha \cdot N_{Max}$ is a maximum number of users per cell, $CPU_{Load}$ is a CPU load, and $\text{Threshold}_{CPU}$ is a threshold of a CPU. Also, $B_{unused}$ is a backhaul average unused amount, $B_{nonGBR}$ is a backhaul average use amount for non-GBR, $N_{QoS,UE}$ is the number of UEs, and max{ } is a backhaul use amount allocatable to a UE which will newly enter the cell. Also, $\text{Min}_{B-Huser}$ is a threshold for a backhaul available amount.

That is, in the case where the number of users for the cell k is greater than or equal to a maximum number of users, in the case where a CPU load for the relevant cell k is greater than the CPU threshold, or in the case where a backhaul use amount allocatable to a UE which will newly enter the cell is less than or equal to a threshold for the backhaul available amount, the cell load calculator 303 determines that no redundant resource exists in a relevant cell, and sets a representative available resource to 0. In other cases, besides the above cases, the cell load calculator 303 determines that a redundant resource exists in the relevant cell and determines the available air resource determined by Equation (1) as a representative available resource.

After that, the cell load calculator 303 calculates a representative cell load as in Equation (4).

$$\text{Representative cell load} = 100 - \min\{C_{DL}, C_{UL}\} \quad (4)$$

where $C_{DL}$ is a representative available resource determined for a downlink of a relevant cell using Equation (3), and $C_{UL}$ is a representative available resource determined for an uplink of a relevant cell using Equation (3).

That is, the cell load calculator 303 determines a representative cell load using a smaller value among the representative downlink available resource and the representative uplink available resource for the relevant cell. The present invention performs load distribution using a representative cell load calculated for each cell.

Particularly, to select a target cell for offloading inside a group or intragroup off loading, as given by Equation (5) to Equation (7) below, the cell load calculator 303 calculates an absolute cell capacity and an absolute available resource using a cell capacity class value and a cell load of each cell. Specifically, the cell load calculator 303 calculates a resource hold amount for each cell, as in Equation (5), with consideration of a frequency bandwidth and an available time resource of each cell, and determines a cell capacity class value, as in Equation (6), using an absolute resource of a cell having a largest air resource among all cells on which load distribution is to be performed, and the resource hold amount for each cell. After that, the cell load calculator 303 calculates an absolute cell capacity, as in Equation (7), using a cell capacity class value and a call capacity value. Here, the cell load calculator 303 may use the representative available resource calculated by Equation (3) as a cell capacity value.

Equation (5) is equation for calculating a resource hold amount for each cell.

$$C^k_{res,XL} = (XL \text{ bandwidth}) \times (XL \text{ time portion}) \quad (5)$$

where k is a cell index, XL is a downlink or an uplink, and $C^k_{res,XL}$ is an uplink or downlink resource hold amount for a cell k. Also, XL bandwidth is an uplink or downlink frequency bandwidth for a relevant cell, and XL time portion is an available time of an uplink or downlink for a relevant cell. Here, XL time portion becomes 1 in case of a Frequency Division Duplexing (FDD) system, and represents a ratio usable as XL data traffic in case of a Time Division Duplexing (TDD) system.

Equation (6) is equation for calculating a cell capacity class value for each cell in terms of a percentage.

$$C\_class^k_{XL} = 100 \times C^k_{res,XL} / C\_max_{res,XL} \quad (6)$$

where $C\_class^k_{XL}$ is a cell capacity class value of an uplink or downlink for a cell k, and $C^k_{res,XL}$ is an uplink or downlink resource hold amount for the cell k calculated by Equation (5). Also, $C\_max_{res,XL}$ is an absolute resource of a cell having a largest air resource among all cells on which load distribution is to be performed.

Equation (7) is equation for calculating an absolute cell capacity.

$$abs\_C^k_{XL} = C\_class^k_{XL} \cdot C^k_{XL} \quad (7)$$

where $abs\_C^k_{XL}$ is an absolute cell capacity of an uplink or downlink for the cell k, $C\_class^k_{XL}$ is a cell capacity class value of an uplink or downlink for the cell k calculated by Equation (6), and $C^k_{XL}$ is a representative available resource of an uplink or downlink for the cell k calculated by Equation (3).

The cell load information generator 305 stores parameter information collected or measured by the cell load monitoring unit 301, and information calculated by the cell load calculator 303, and provides the same to the transceiver 311. That is, the cell load information generator 305 generates a cell load information message including at least one of an uplink/downlink hardware load (such as a CPU use rate) collected or measured by the cell load monitoring unit 301, an uplink/downlink S1 Transport Network Layer (TNL) load (such as a backhaul use rate), an uplink/downlink Physical Resource Block (PRB) use rate, an uplink/downlink non- GBR PRB use rate, an uplink/downlink entire PRB use rate, an uplink/downlink cell capacity class value calculated by the cell load calculator 303, an uplink/downlink cell capacity value, a representative cell load, and an absolute cell capacity with respect to each cell, and provides the generated cell load information message to the transceiver 311. At this point, cell load information generator 305 generates a cell load information message every period set in advance or every event occurrence point set in advance to provide the same to the transceiver 311. Particularly, the present invention may exchange and use a representative available resource calculated by the cell load calculator 303 instead of an uplink/downlink cell capacity value defined in the standard.

The load distribution determining unit 307 periodically monitors a cell load of each of serving cells measured by the cell load calculator 303 to determine whether a cell meeting a load distribution condition exists. In the case where the cell meeting the load distribution condition exists, the load distribution determining unit 307 determines a load distribution method to perform among the three load distribution methods provided by the present invention depending on a cell load of a relevant cell, and determines a target cell and a target terminal whose loads are to be distributed among serving cells and neighbor cells according to the determined load distribution method.

In detail, the load distribution determining unit 307 compares a representative cell load (referred to as a 'cell load' hereinafter) calculated in advance with an equal threshold, an offload threshold inside a group, and an intragroup offload threshold to determine a load distribution method to perform with respect to each of cells that are being serviced.

That is, in the case where a cell load of a specific cell is greater than or equal to the equal threshold and less than the offload threshold inside the group among a plurality of serving cells with respect to each of multi-carriers, the load distribution determining unit 307 determines to perform the offloading inside the group, selects cells belonging to the same group as the specific cell and existing in the same position as the specific cell, and selects cells whose cell load is less than the cell load of the specific cell by an equal difference value or more among the selected cells as a candidate target cell. That is, the load distribution determining unit 307 calculates a difference value between a cell load of each co-located cell inside the group and a cell load of the specific cell, and selects a cell where the calculated difference value is greater than the equal threshold set in advance as the candidate target cell. Here, selecting the cell where the difference value of the cell load is greater than the equal threshold as the candidate target cell is for preventing a ping pong phenomenon that a terminal is handed-over from the specific cell to the target cell and then the terminal is handed-over from the target cell to the specific cell. After that, the load distribution determining unit 307 sorts selected candidate target cells in a descending order of a representative available resource.

After that, the load distribution determining unit 307 selects terminals corresponding to a predetermined number among a plurality of terminals that receive a service from the specific cell, and requests them to report signal reception strength for the selected candidate target cells. The load distribution determining unit 307 then receives a report message representing the signal reception strength from the terminals, and determines a terminal whose signal reception strength from a relevant candidate target cell is greater than or equal to a threshold as a candidate terminal for each candidate target cell, and sorts candidate terminals determined for each candidate target cell according to the signal reception strength. After that, the load distribution determining unit 307 sequentially selects candidate terminals whose signal reception strength is greater than or equal to the threshold by the number of target terminals set in advance with respect to a candidate target cell whose representative available resource is the largest, and determines the selected candidate terminals as a target terminal. Here, in the case where the candidate terminals whose signal reception strength is greater than or equal to the threshold is less than the number of the target terminals set in advance, the load distribution determining unit 307 determines target cells and target terminals until the number of target terminals set in advance is filled based on a sorting order of candidate target cells depending on a representative available resource and a sorting order of candidate terminals depending on signal reception strength for a candidate target cell. Here, a different plurality of target terminals may be selected for one target cell, but the same target terminal should not be selected for a different plurality of target cells. After that, the load distribution determining unit 307 controls and processes a function for allowing a target terminal determined among terminals that receive a service from the specific cell to perform a handover to a co-located target cell inside the same group. As described above, the present invention may maintain a load difference for each carrier within a predetermined value inside the same carrier group by allowing a terminal of the specific cell to perform a handover to a co-located target cell of the same group, thereby delaying occurrence of an overload with respect to a specific carrier inside the group.

Also, in the case where the cell load of the specific cell among a plurality of serving cells with respect to each multi-carrier is greater than or equal to the offload threshold inside the group and less than an intragroup load equalization threshold, the load distribution determining unit 307 determines to perform the off loading inside the group. After that, the load distribution determining unit 307 selects all cells neighboring the specific cell among cells belonging to the same group as the specific cell, and selects cells whose cell load is less than a first object load among the selected cells as a candidate target cell. Here, the selected cells may be cells having the same carrier as the carrier of the specific cell and corresponding to a different position, may be cells having a carrier different from the carrier of the specific cell and corresponding to the same position, and may be cells having a carrier different from the carrier of the specific cell and corresponding to a different position. Selecting a cell whose cell load is less than the first object load as a candidate target cell is for preventing a ping pong phenomenon that a terminal is handed-over from the specific cell to the target cell and then the terminal is handed-over from the target cell to the specific cell.

After that, the load distribution determining unit 307 sorts selected candidate target cells in a descending order of absolute call capacity. The load distribution determining unit 307 then selects terminals corresponding to a number set in advance among a plurality of terminals that receive a service from the specific cell to request them to report signal reception strength for the selected candidate target cells. The load distribution determining unit 307 then receives a report message representing signal reception strength from the terminals, and determines a terminal whose signal reception strength from a relevant candidate target cell is greater than signal reception strength from the specific cell by a threshold difference value or more, as a candidate terminal with respect to the candidate target cell having the same carrier as the specific cell, and determines a terminal whose signal reception strength from a relevant candidate target cell is greater than or equal to a threshold as a candidate terminal with respect to the candidate target cell having a carrier different from the specific cell. Next, the load distribution determining unit 307 sorts candidate terminals determined for each candidate target cell according to signal reception strength. After that, the load distribution determining unit 307 sequentially selects candidate terminals whose signal reception strength is greater than or equal to a threshold by the number of target terminals set in advance with respect to a candidate target cell whose absolute cell capacity is largest among candidate target cells to determine a relevant candidate cell as a target cell, and determines the selected candidate terminals as a target terminal. Here, in the case where the candidate terminals whose signal reception strength is greater than or equal to the threshold is less than the number of target terminals set in advance with respect to the candidate target cell whose absolute cell capacity is largest, the load distribution determining unit 307 determines a target cell and a target terminal until the number of target terminals set in advance is filled based on a sorting order of candidate target cells depending on an absolute cell capacity and a sorting order of candidate terminals depending on signal reception strength with respect to a candidate target cell. Here, a different plurality of target terminals may be selected for one target cell, but the same target terminal should not be selected for a different plurality of target cells. After that, the load distribution determining unit 307 controls and processes a function for allowing a target terminal determined among terminals that receive a service from the specific cell to perform a handover to a target cell inside the same group.

Also, in the case where the cell load of the specific cell among a plurality of serving cells with respect to each multi-carrier is greater than or equal to the intragroup offload threshold, the load distribution determining unit 307 determines to perform the intragroup off loading. The load distribution determining unit 307 selects all cells neighboring the specific cell among cells belonging to a group different from the specific cell, and selects cells whose cell load is less than a second object load among the selected cells as a candidate target cell. Here, selecting the cells whose cell load is less than the second object load as the candidate target cell is for preventing a ping pong phenomenon that a terminal is handed-over from the specific cell to the target cell and then the terminal is handed-over from the target cell to the specific cell. After that, the load distribution determining unit 307 sorts the selected candidate target cells in a descending order of absolute cell capacity. The load distribution determining unit 307 then selects terminals corresponding to a number set in advance among a plurality of terminals that receive a service from the specific cell to request them to report signal reception strength for the selected candidate target cells. After that, the load distribution determining unit 307 receives a report message representing signal reception strength from the terminals, and then determines a terminal whose signal reception strength from a relevant candidate target cell is greater than or equal to a threshold as a candidate terminal with respect to each candidate target cell.

The load distribution determining unit 307 then sorts candidate terminals determined for each candidate target cell according to signal reception strength. After that, the load distribution determining unit 307 sequentially selects candidate terminals whose signal reception strength is greater than or equal to a threshold by the number of target terminals set in advance to determine a relevant candidate cell as a target cell, and determines the selected candidate terminals as a target terminal with respect to a candidate target cell whose absolute cell capacity is largest among candidate target cells. Here, in the case where candidate terminals whose signal reception strength is greater than or equal to a threshold are less than the number of target terminals set in advance with respect to a candidate target cell whose absolute cell capacity is largest, the load distribution determining unit 307 determines a target cell and a target terminal until the number of target terminals set in advance is filled based on a sorting order of candidate target cells depending on an absolute cell capacity and a sorting order of candidate terminals depending on signal reception strength with respect to a candidate target cell. Here, a different plurality of target terminals may be selected for one target cell, but the same target terminal should not be selected for a different plurality of target cells. After that, the load distribution determining unit 307 controls and processes a function for allowing a target terminal determined among terminals that receive a service from the specific cell to perform a handover to a target cell of a different group. At this point, in the case where the target cell is a serving cell of a neighbor base station, not a serving cell of the base station, the load distribution determining unit 307 transmits/receives a signal to/from the neighbor base station to control and process a function for allowing the target terminal to perform a handover to the serving cell of the neighbor base station.

The call processor 309 performs a function for allowing the target terminal to perform a handover from a source cell to a target cell based on the target cell and the target terminal determined by the load distribution determining unit 307.

The transceiver 311 performs a function for transmitting/receiving a signal to/from the neighbor base station and the UE under control of the controller 300. Particularly, the transceiver 311 controls and processes a function for exchanging cell load information with the neighbor base station. That is, the transceiver 311 transmits a cell load information message generated by the cell load information generator 305 to at least one neighbor base station, and receives a cell load information message from at least one neighbor base station to provide the received cell load information message to the load distribution determining unit 307. At this point, the transceiver 311 transmits or receives a cell load information message every period set in advance or every event occurrence point set in advance. Also, the transceiver 311 transmits a message requesting cell load information to a neighbor base station corresponding to a neighbor cell. Also, the transceiver 311 transmits and receives a signal for allowing a UE that has accessed a source cell of the base station to perform a handover to the target cell under control of the controller 300. The transceiver 311 also requests a plurality of terminals that have accessed a specific serving cell to report received signal strength information for the target cell, and receives the received signal strength information for the target cell from the plurality of terminals.

In the above description, the equal threshold for determining whether to perform load equalization should be set smaller than the offload threshold inside the group for determining whether to perform the offloading inside the group, and the offload threshold inside the group should be set smaller than the intragroup offload threshold for determining whether to perform the intragroup offloading. This is for allowing the load equalization to be preferentially performed prior to the offloading inside the group, and for allowing the offloading inside the group to be preferentially performed prior to the intragroup offloading. Also, the first object load and the second object load should be set smaller than the offload threshold inside the group. Also, in the case where a plurality of companies share a specific multi-carrier, a multi-carrier group may be classified depending on a company policy, and a plurality of the intragroup offload thresholds for performing the intragroup offloading may be set.

Figure 6:
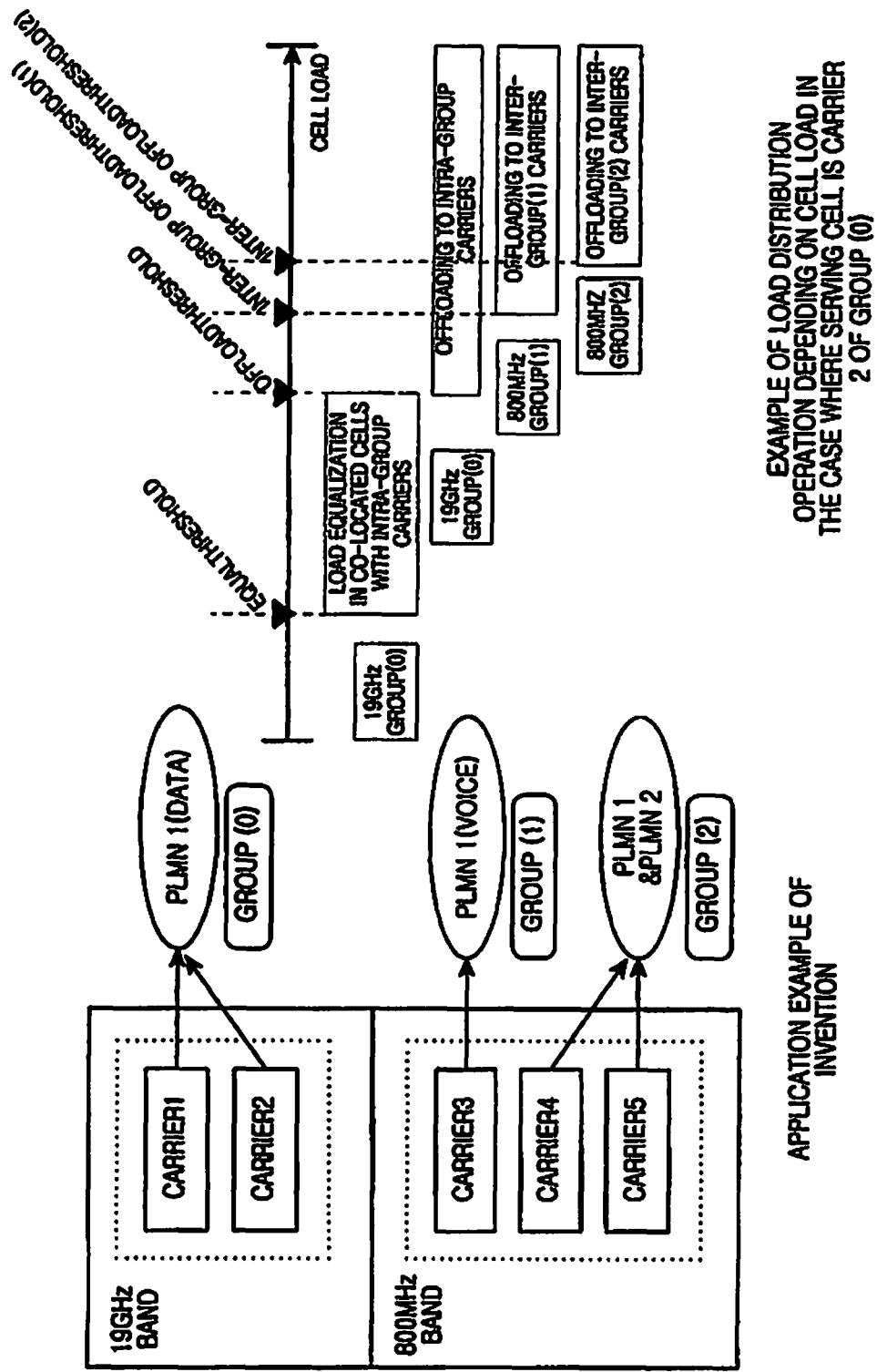
FIG. 6 illustrates an example of performing load distribution based on a group classified according to a company policy in a wireless communication system according to an embodiment of the present invention.

For example, as illustrated in FIG. 6, a description is made on the assumption that in circumstances where a carrier 1 and a carrier 2 corresponding to a 1.9 GHz band exist and a carrier 3, carrier 4 and a carrier 5 corresponding to an 800 MHz band exist, a PLMN 1 uses the carrier 1 and the carrier 5, and a PLMN2 uses the carrier 4 and the carrier 5. At this point, the present invention may classify the carrier 1 and carrier 2 into a group 0, the carrier 3 into a group 1, and the carrier 4 and the carrier 5 into a group 2 with consideration of a PLMN for each carrier and a frequency band. Also, since the PLMN 1 possesses a plurality of carriers, the present invention allows load distribution between specific groups to be preferentially performed by setting a plurality of intergroup offload thresholds.

That is, in the case where a cell load of a cell of the carrier 1 and the carrier 2 belonging to the group 0 is greater than a first intergroup offload threshold(1), a cell of the carrier 3 belonging to the group 1 is selected as a target cell, so that load distribution may be performed. In the case where a cell load of a cell of the carrier 1 or the carrier 2 belonging to the group 0 or the carrier 3 belonging to the group 1 is greater than a second intergroup offload threshold(2), a cell of the carrier 4 or the carrier 5 belonging to the group 2 is selected as a target cell, so that load distribution may be performed. Here, the first intergroup offload threshold(1) is set smaller than the second intergroup offload threshold(2), so that the PLMN 1 may allow load distribution to be preferentially performed between carriers of the group 0 and the group 1 exclusively used by the PLMN 1 rather than carriers of the group 2 shared by the company 2.

Also, according to an embodiment of the present invention, whether to use the load equalization, the offloading inside the group, and the intragroup offloading may be determined based on a company policy. For example, for load distribution inside a group, the load equalization and the offloading inside the group may be simultaneously used and only the offloading may be used without using the load equalization depending on a company policy.

Figure 4:
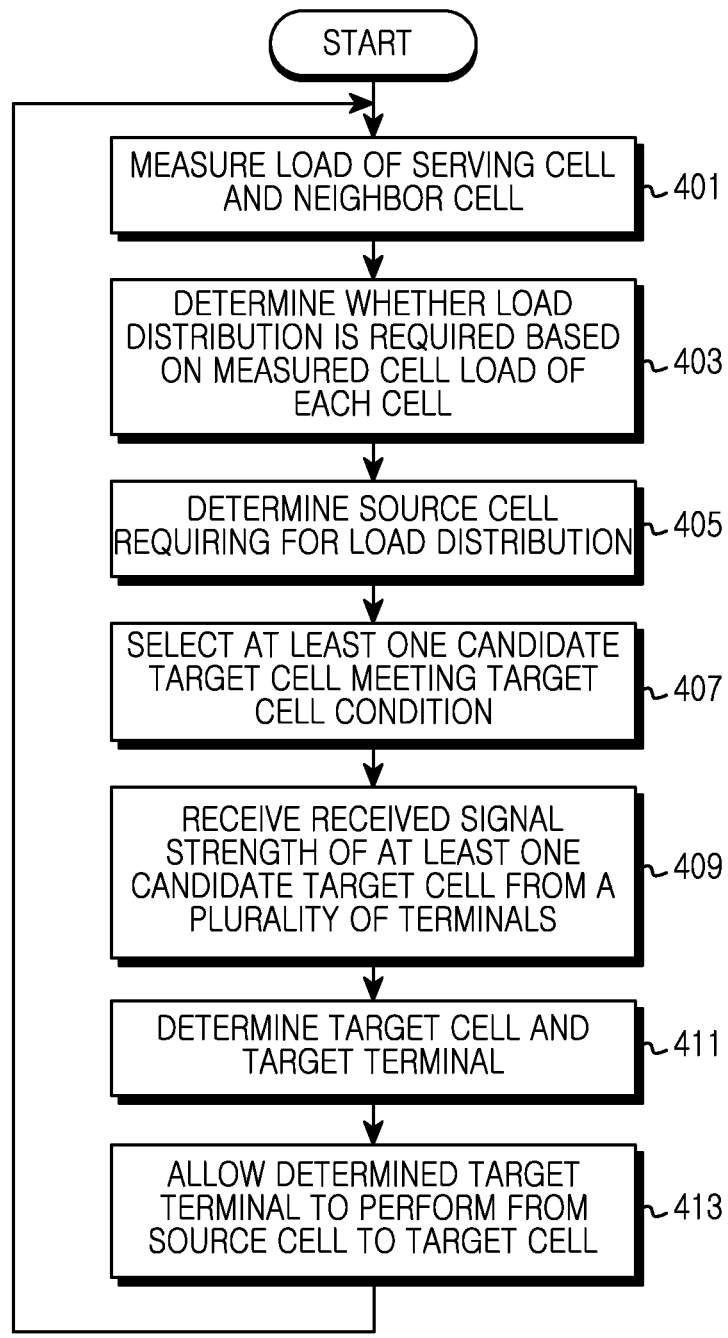
FIG. 4 is a flowchart illustrating a procedure for distributing a load of a base station in a wireless communication system according to an embodiment of the present invention.

FIG. 4 illustrates a procedure for distributing a load of a base station in a wireless communication system according to an embodiment of the present invention.

Referring to FIG. 4, the base station measures a cell load of a serving cell and a neighbor cell in step 401. That is, the base station periodically collects and measures various parameter information required for measuring the cell load, and measures a representative cell load using the collected and measured parameters as expressed by Equations (1) and (4). The present invention denotes a representative cell load by a cell load. Here, the cell load of a neighbor cell may be measured based on information periodically exchanged with a neighbor base station.

After that, the base station determines whether load distribution is required based on the cell load measured for the serving cell and the neighbor cell in step 403, and determines a source cell needing the load distribution in step 405. That is, the base station compares the cell load of each cell measured in step 401 with the equal threshold set in advance, the offload threshold inside the group, and the intragroup offload threshold to determine whether a cell whose cell load is greater than or equal to at least one of the three thresholds exists. Here, in the case where the cell load of a specific cell is greater than or equal to at least one of the three thresholds, the base station determines that load distribution for the specific cell is needed and determines the specific cell as a source cell.

The base station then selects at least one candidate target cell meeting a target cell condition in step 407. That is, the base station determines co-located cells inside the same group, cells neighboring the source cell inside the same group, or cells neighboring the source cell in a different group as object cells depending on the cell load of the source cell, and selects a cell whose cell load meets a threshold condition among the object cells as a candidate target cell.

The base station then receives a received signal strength value of at least one candidate target cell from a plurality of terminals in step 409. The base station selects arbitrary terminals corresponding to a predetermined number among terminals that receive a service from the source cell, and then requests the selected arbitrary terminals to report the received signal strength value of the at least one candidate target cell. After that, the base station may receive a report message including the received signal strength value of the at least one candidate target cell from the selected arbitrary terminals.

The base station proceeds to step 411 to determine a target cell and a target terminal on which load distribution of the source cell is to be performed. The base station sorts candidate target cells in a descending order of a representative available resource or an absolute cell capacity of each selected candidate target cell, and sorts candidate target terminals whose received signal strength is greater than or equal to a threshold in a descending order of the received signal strength with respect to each candidate target cell, and determines a target cell and a target terminal until the number of target terminals set in advance is filled based on the sorted sequence in step 407. Here, the base station may calculate a representative available resource of each candidate target cell using Equation (3), and calculate an absolute cell capacity of each candidate target cell using Equations (5) to (7).

After that, the base station proceeds to step 413 to perform a function for allowing the determined target terminal to perform a handover from the source cell to the target cell.

The base station then returns to step 401 to re-perform the subsequent steps.

Figure 5A:
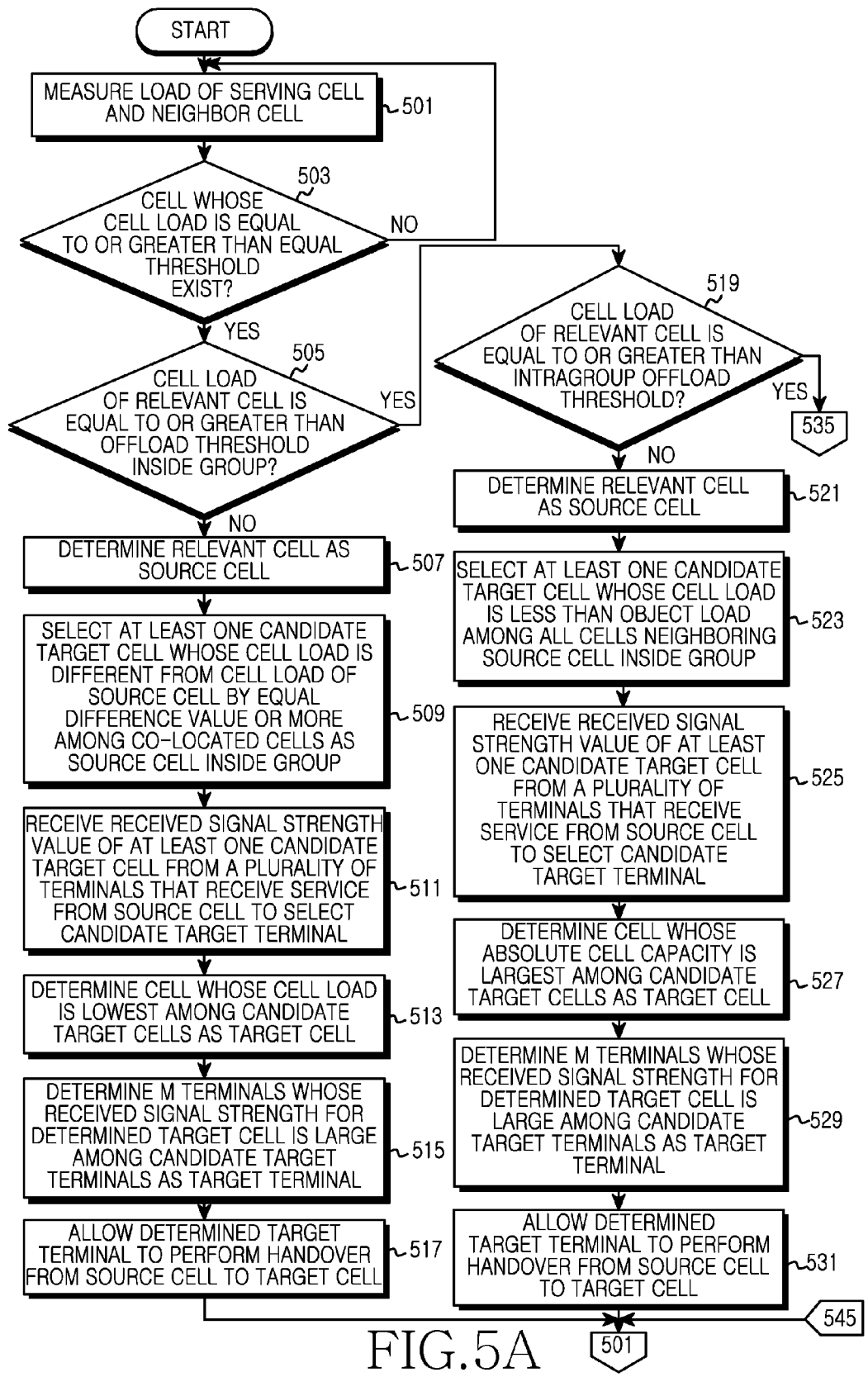
FIGS. 5A and 5B are flowcharts illustrating procedures for performing a group-based load distribution in a base station of a wireless communication system according to an embodiment of the present invention.
Figure 5B:
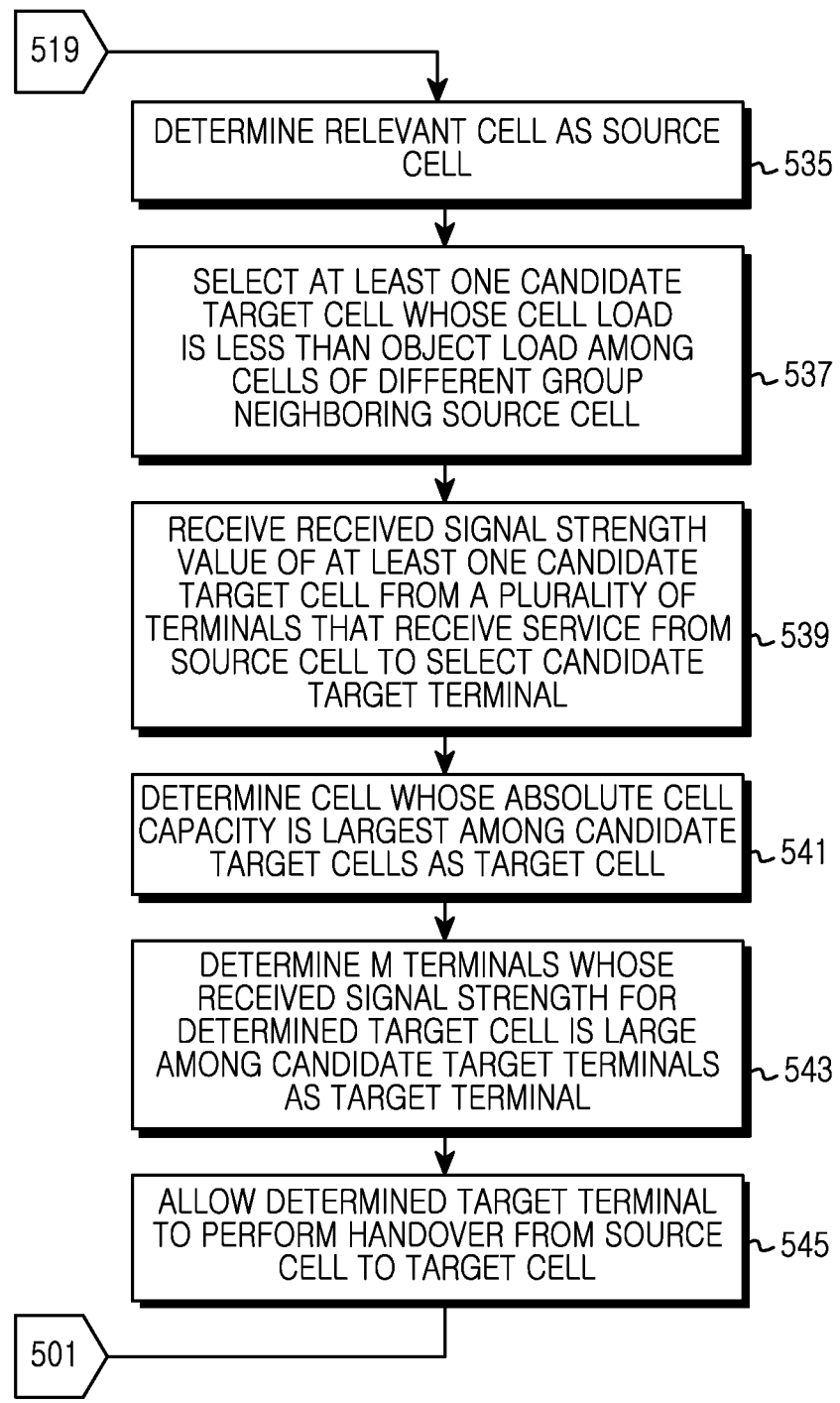

FIGS. 5A and 5B illustrate procedures for performing a group-based load distribution in a base station of a wireless communication system according to an embodiment of the present invention.

Referring to FIGS. 5A and 5B, the base station measures a cell load of a serving cell and a neighbor cell in step 501. That is, the base station periodically collects and measures various parameter information required for measuring the cell load, and measures a representative cell load using the collected and measured parameters as expressed by Equations (1) and (4). The present invention denotes a representative cell load by a cell load. Here, the cell load of the neighbor cell may be measured based on information periodically exchanged with a neighbor base station.

The base station proceeds to step 503 to determine whether a cell whose cell load is greater than or equal to an equal threshold set in advance exists. In the case where the cell whose cell load is greater than or equal to the equal threshold does not exist, the base station returns to step 501 to perform the subsequent steps.

In contrast, in the case where the cell whose cell load is greater than or equal to the equal threshold exists, the base station determines whether the load of a relevant cell is greater than or equal to an offload threshold inside a group in step 505.

In the case where the cell load of the relevant cell is less than the offload threshold inside the group, the base station determines that the load equalization inside the group is required, and proceeds to step 507 to determine the relevant cell as the source cell. The base station then proceeds to step 509 to select cells belonging to the same group as the source cell and existing in the same position as the source cell. For example, referring to FIG. 2, in the case where the source cell is a cell corresponding to the carrier 1 of the sector B 220, the base station may select a cell corresponding to the carrier 2 of the sector B 220 of the group 0 as a candidate target cell. In step 509, the base station selects cells whose cell load is less than the cell load of the source cell by an equal difference value or more among the selected cells as a candidate target cell. That is, the base station calculates a difference value between the cell load of each co-located cell inside the group and the cell load of the source cell, and selects a cell where the calculated difference value is greater than an equal threshold set in advance as the candidate target cell. At this point, the base station sorts the selected candidate target cells in a descending order of a representative available resource. Here, selecting the cell whose cell load difference value is greater than the equal threshold as the candidate target cell is for preventing a ping pong phenomenon that a terminal is handed-over from the source cell to the target cell and then the terminal is handed-over from the target cell to the source cell.

The base station receives a received signal strength value of at least one candidate target cell from a plurality of terminals that receive a service from the source cell to select a candidate target terminal in step 511. The base station selects terminals corresponding to a number set in advance among the plurality of terminals that receive a service from the source cell to request them to report received signal strength of the selected candidate target cells, receives a report message representing the received signal strength from the selected terminals, and then determines a terminal whose received signal strength from a relevant candidate target cell is greater than or equal to a threshold as a candidate terminal for each candidate target cell. At this point, the base station sorts candidate terminals determined for each candidate target cell according to the received signal strength.

The base station then determines a cell whose cell load is lowest among the candidate target cells as a target cell in step 513. At this point, the base station may determine a cell whose representative available resource is largest among the candidate target cells as the target cell whose cell load is lowest. Next, the base station proceeds to step 515 to determine M terminals whose received signal strength for the target cell is large among candidate target terminals corresponding to the determined target cell as a target terminal. In the case where the number M of the determined target terminals is less than the number of target terminals set in advance, the base station additionally determines a candidate target cell whose representative available resource is second largest among the candidate target cells as the target cell, and determines N terminals as the target terminal with respect to the additionally determined target cell. At this point, the base station repeatedly performs a procedure for determining a target cell and a target terminal until the number (for example, M+N) of determined target terminals becomes the same as the number of target terminals set in advance. Also, the base station allows a plurality of different target terminals to be selected with respect to one target cell and does not allow the same target terminal to be selected for a plurality of different target cells.

After that, the base station allows the target terminal determined among the terminals that receive a service from the source cell to perform a handover to the co-located target cell inside the same group in step 517, and returns to step 501 to re-perform the subsequent steps. As described above, the present invention maintains a load difference for each carrier within a predetermined value inside the same carrier group by allowing the terminal of the source cell to perform a handover to a co-located target cell of the same group, thereby delaying occurrence of an overload with respect to a specific carrier inside the group.

Referring back to step 505, in the case where the cell load of a relevant cell is greater than or equal to an offload threshold inside the group, the base station proceeds to step 519 to determine whether the cell load of the relevant cell is greater than or equal to an intragroup offload threshold.

If the cell load of the relevant cell is less than the intragroup offload threshold, the base station determines that offloading inside the group is required and proceeds to step 521 to determine the relevant cell as a source cell.

The base station selects all cells neighboring the source cell among cells belonging to the same group as the source cell, and selects cells whose cell load is less than a first object load among the selected cells as a candidate target cell in step 523. Here, the selected cells may be cells having the same carrier as the carrier of the source cell and corresponding to a different position, or cells having a carrier different from the carrier of the source cell and corresponding to the same position, or cells having a carrier different from the carrier of the source cell and corresponding to a different position. For example, referring to FIG. 2, in the case where the source cell corresponds to the carrier 1 of the sector B 220, the base station may select a cell corresponding to the carrier 2 of the sector B 220 belonging to the group 0, a cell corresponding to the carrier 1 of the sector A 210 belonging to the group 0, and a cell corresponding to the carrier 2 of the sector A 210 belonging to the group 0. Here, selecting the cell whose cell load is less than the first object load as the candidate target cell is for preventing a ping pong phenomenon that a terminal is handed-over from the specific cell to the target cell and then the terminal is handed-over from the target cell to the specific cell. At this point, the base station sorts the selected candidate target cells in a descending order of an absolute cell capacity. Here, the base station may calculate an absolute cell capacity of each candidate target cell using Equations (5) to (7).

The base station then receives a received signal strength value of at least one candidate target cell from a plurality of terminals that receive a service from the source cell to select a candidate target cell in step 525. That is, the base station selects terminals corresponding to a number set in advance among the plurality of terminals that receive the service from the source cell, requests them to report received signal strength from the selected candidate target cells, and then receives a report message representing the received signal strength from the selected terminals. After that, the base station determines a terminal where received signal strength from a relevant candidate target cell is greater than the received signal strength from the source cell by a threshold difference value or more, as a candidate terminal with respect to a candidate target cell having the same carrier as the source cell, and determines a terminal where the received signal strength from the relevant candidate target cell is greater than or equal to a threshold as a candidate terminal with respect to a candidate target cell having a carrier different from the source cell.

In step 527, the base station determines a cell whose absolute cell capacity is largest among candidate target cells as a target cell, and proceeds to step 529 to determine M terminals whose received signal strength for the target cell is large among candidate target terminals corresponding to the determined target cell as a target terminal. At this point, in the case where the number M of the determined target terminals is less than the number of target terminals set in advance, the base station additionally determines a candidate target cell whose absolute cell capacity is second largest among the candidate target cells, as a target cell, and determines N terminals as target terminals with respect to the additionally determined target cell. The base station repeatedly performs a procedure for determining a target cell and a target terminal until the number (for example, M+N) of determined target terminals becomes the same as the number of target terminals set in advance. Also, the base station allows a plurality of different target terminals to be selected with respect to one target cell and does not allow the same target terminal to be selected for a plurality of different target cells.

After that, the base station allows the target terminal determined among the terminals that receive a service from the source cell to perform a handover to a target cell neighboring the source cell inside the same group in step 531 and returns to step 501 to re-perform the subsequent steps.

Returning to step 519, in the case where the cell load of the relevant cell is greater than or equal to the intragroup offload threshold, the base station determines that intragroup offloading is required and proceeds to step 535 to determine the relevant cell as the source cell.

As seen in FIG. 5B, in step 535, the base station selects all cells neighboring the source cell among cells belonging to a group different from the source cell, and selects cells whose cell load is less than a second object load among the selected cells as a candidate target cell in step 537. For example, referring to FIG. 2, in the case where the source cell corresponds to the carrier 1 of the sector B 220, the base station may select a cell corresponding to the carrier 3 of the sector B 220 belonging to the group 1, a cell corresponding to the carrier 3 of the sector A 210 belonging to the group 1, and a cell corresponding to the carrier 4 of the sector B 220 belonging to the group 2. Here, selecting a cell whose cell load is less than the second object load as a candidate target cell is for preventing a ping pong phenomenon that a terminal is handed-over from the specific cell to the target cell and then the terminal is handed-over from the target cell to the specific cell. After that, the base station sorts the selected candidate target cells in a descending order of an absolute cell capacity. Here, the base station may calculate an absolute cell capacity of each candidate target cell using Equations (5) to (7).

The base station receives a received signal strength value for at least one candidate target cell from a plurality of terminals that receive a service from the source cell to select a candidate target terminal in step 539. That is, the base station selects terminals corresponding to a number set in advance among the plurality of terminals that receive a service from the source cell, requests them to report received signal strength for the selected candidate target cells, and receives a report message representing the received signal strength from the selected terminals. After that, the base station determines a terminal where received signal strength from a relevant candidate target cell is greater than or equal to a threshold, as a candidate terminal with respect to each candidate target cell.

In step 541, the base station determines a cell whose absolute cell capacity is largest among the candidate target cells as a target cell, and proceeds to step 543 to determine M terminals where received signal strength for the target cell is large among candidate target terminals corresponding to the determined target cell, as a target terminal. At this point, in the case where the number M of the determined target terminals is less than the number of target terminals set in advance, the base station additionally determines a candidate target cell whose absolute cell capacity is second largest among the candidate target cells, as a target cell, and determines N terminals as target terminals with respect to the additionally determined target cells. The base station repeatedly performs a procedure for determining a target cell and a target terminal until the number (for example, M+N) of determined target terminals becomes the same as the number of target terminals set in advance. Also, the base station allows a plurality of different target terminals to be selected with respect to one target cell and does not allow the same target terminal to be selected for a plurality of different target cells.

In step 545, the base station allows the target terminal determined among the terminals that receive a service from the source cell to perform a handover to the target cell neighboring the source cell, and returns to step 501 to re-perform the subsequent steps.

Though the cell load is sequentially compared with the equal threshold, the offload threshold inside the group, and the intragroup offload threshold via step 503, step 505, and step 519 in FIGS. 5A and 5B, it is obvious that step 503, step 505, and step 519 can be performed at the same point in time.

Hereinafter, a method for classifying a group of a multi-carrier depending on a purpose of a carrier, a company, and a company policy is described using an example with reference to FIGS. 7A to 9B.

Figure 7A:
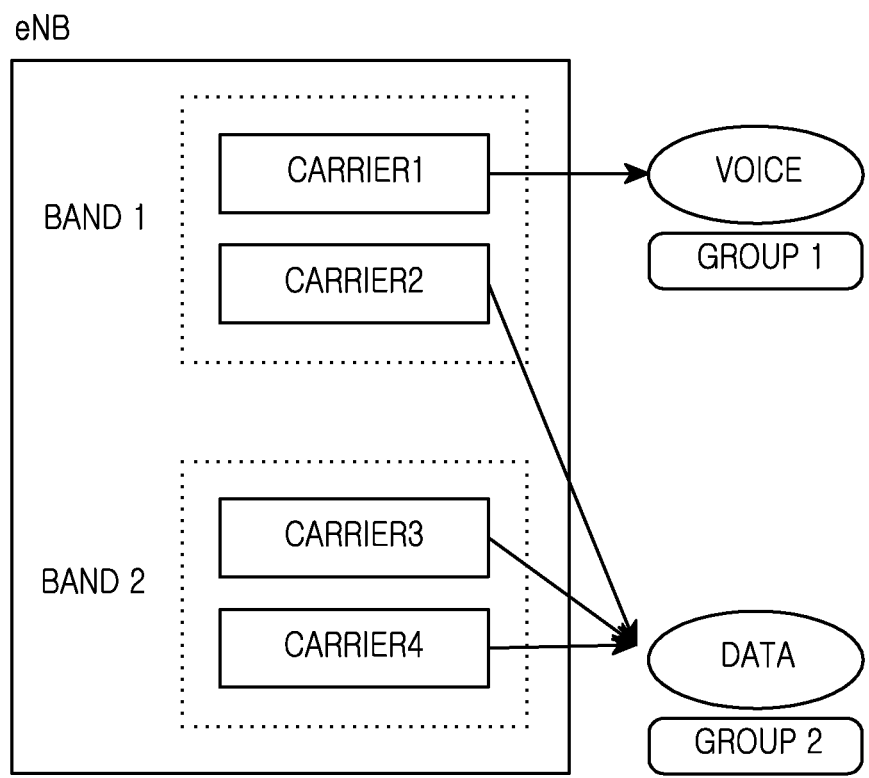
FIGS. 7A and 7B illustrate a carrier group depending on a purpose in a wireless communication system according to an embodiment of the present invention.
Figure 7B:
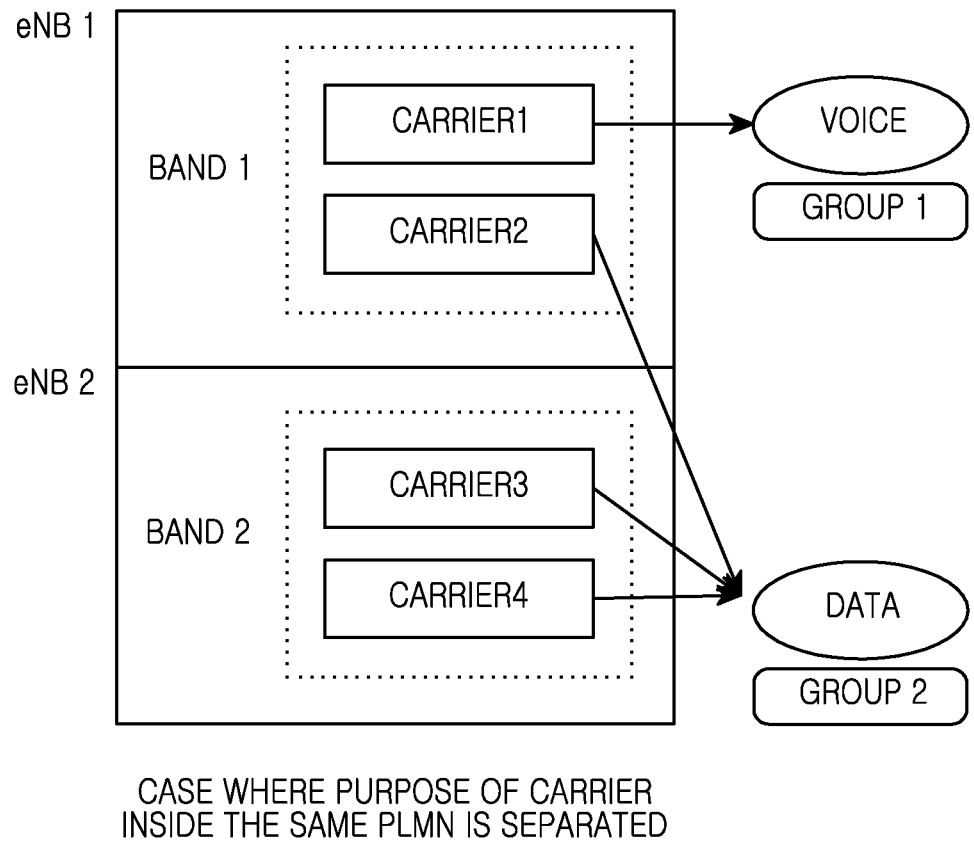

FIGS. 7A and 7B illustrate a carrier group depending on a purpose in a wireless communication system according to an embodiment of the present invention. Here, as illustrated in FIG. 7A, multi-carriers supported by a specific base station may be classified into a plurality of groups, and as illustrated in FIG. 7B, multi-carriers supported by a plurality of base stations may be classified into a plurality of groups.

As illustrated in FIGS. 7A and 7B, assuming that the carrier 1 is set as a carrier for a voice service, and the carrier 2, the carrier 3 and the carrier 4 are set as a carrier for a data service, the carrier 1 may be classified into the group 1 and the carrier 2, the carrier 3 and the carrier 4 may be classified into the group 2 based on the purpose for each carrier according to an embodiment of the present invention.

As described above, when the carrier is separated for the voice service and for the data service, load distribution may not be performed between the carrier for the voice service and the carrier for the data service. That is, where a terminal requests the voice service, the base station provides the voice service to the terminal using the carrier 1 even when the cell load of a cell of the carrier 1 is high. However, according to an embodiment of the present invention, after the voice service of the terminal is completed, the relevant terminal may be moved to a cell corresponding to one of the carrier 2, the carrier 3 or the carrier 4. Also, the base station may perform load distribution between carriers for the data service, that is, the off loading inside the group.

Figure 8A:
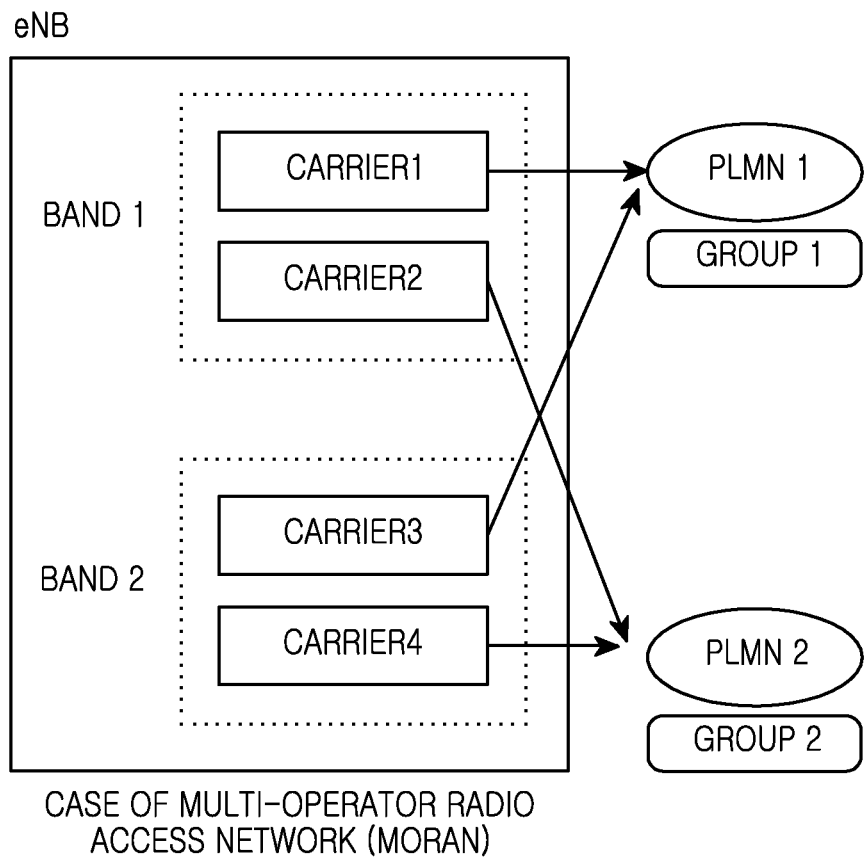
FIGS. 8A and 8B illustrate a carrier group depending on a company in a wireless communication system according to an embodiment of the present invention.
Figure 8B:
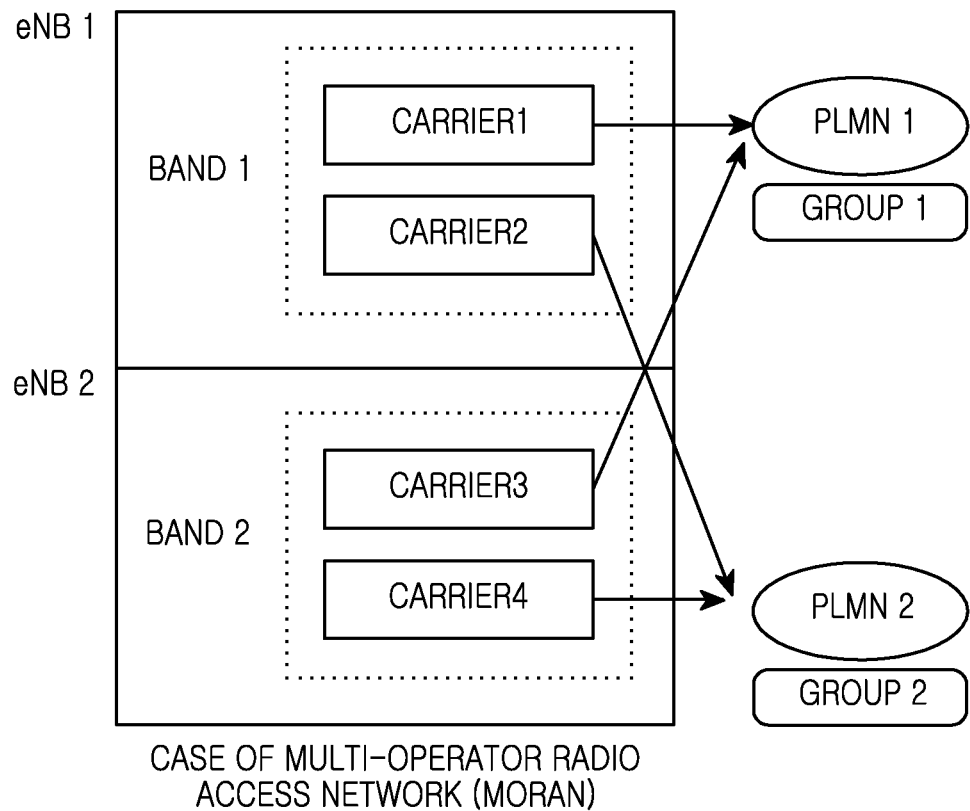

FIGS. 8A and 8B illustrate a carrier group depending on a company in a wireless communication system according to an embodiment of the present invention. Here, as illustrated in FIG. 8A, multi-carriers supported by a specific base station may be classified into a plurality of groups, and as illustrated in FIG. 8B, multi-carriers supported by a plurality of base stations may be classified into a plurality of groups.

As illustrated in FIGS. 8A and 8B, assuming that the carrier 1 and the carrier 3 are set as a carrier for a Public Land Mobile Network 1(PLMN 1), and the carrier 2 and the carrier 4 are set as a carrier for a PLMN 2, according to an embodiment of the present invention, the carrier 1 and the carrier 3 may be classified into the group 1, and the carrier 2 and the carrier 4 may be classified into the group 2 based on a company for each carrier.

As described above, in the case where the PLMN 1 dedicated carrier and the PLMN 2 dedicated carrier are operated separately, only load distribution inside a group may be performed and intragroup load distribution may be performed, or both the load distribution inside the group and the intragroup load distribution may be performed depending on whether a handover between the group 1 and the group 2 is supported by a contract between the PLMN 1 and the PLMN 2. That is, where the handover between the group 1 and the group 2 is not supported, load distribution for the carriers of the group 1 and the carriers of the group 2 cannot be performed, and only load distribution for the carriers inside a relevant group can be performed. On the contrary, where the handover between the group 1 and the group 2 is supported, load distribution for the carriers of the group 1 and the carriers of the group 2 and load distribution for the carriers inside the relevant group can be performed.

Figure 9A:
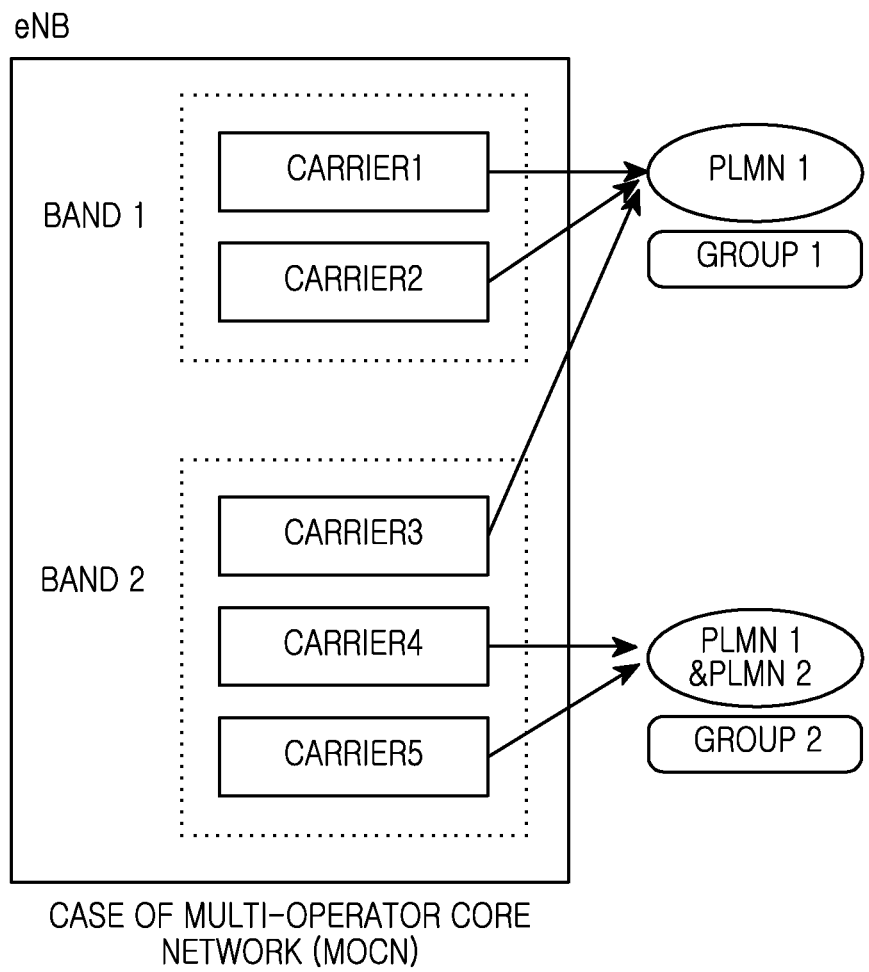
FIGS. 9A and 9B illustrate a carrier group depending on carrier sharing of a company in a wireless communication system according to an embodiment of the present invention.
Figure 9B:
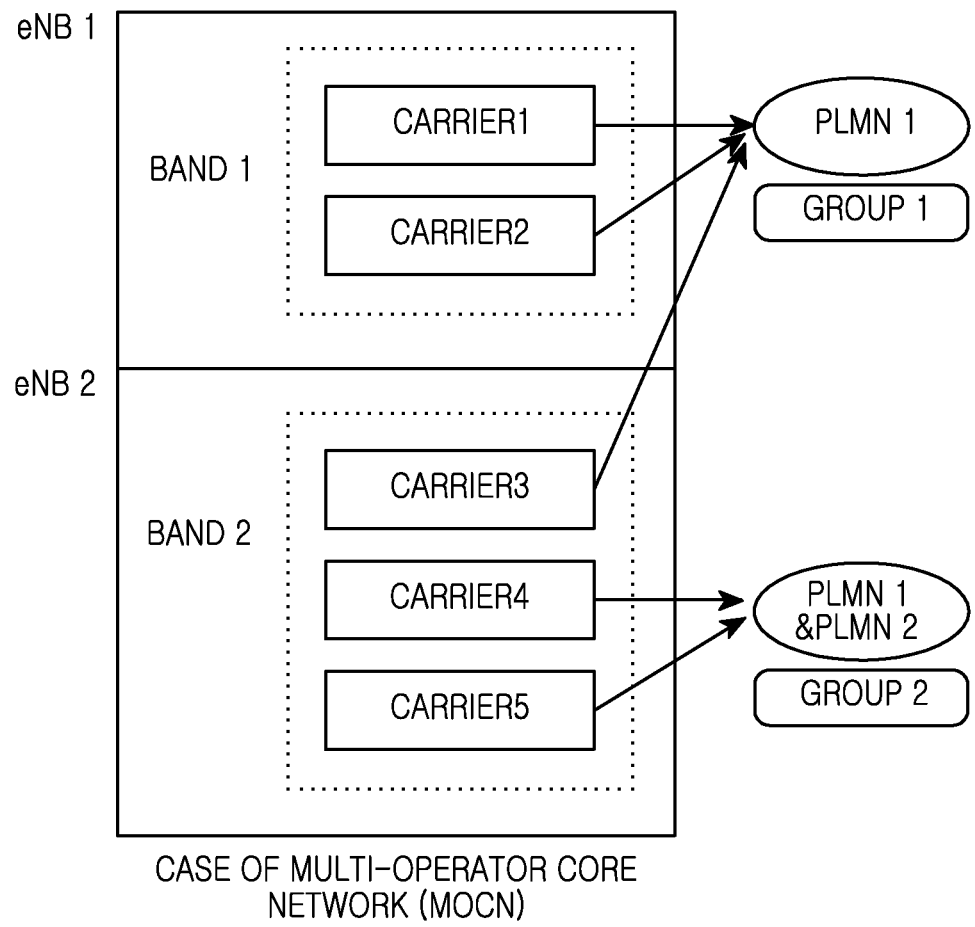

FIGS. 9A and 9B illustrate a carrier group depending on carrier sharing of a company in a wireless communication system according to an embodiment of the present invention. Here, as illustrated in FIG. 9A, multi-carriers supported by a specific base station may be classified into a plurality of groups, and as illustrated in FIG. 9B, multi-carriers supported by a plurality of base stations may be classified into a plurality of groups.

As illustrated in FIGS. 9A and 9B, assuming that the carrier 1, the carrier 2 and the carrier 3 are set as a carrier for the PLMN 1, and the carrier 4 and the carrier 5 are set as a carrier shared by the PLMN 1 and the PLMN 2, according to an embodiment of the present invention, the carrier 1, the carrier 2 and the carrier 3 may be classified into the group 1, and the carrier 4 and the carrier 5 may be classified into the group 2 based on a company for each carrier.

As described above, in the case where a portion of the carriers is operated as the dedicated carrier of the PLMN 1 and a portion of the carriers is shared by the PLMN 1 and the PLMN 2, load distribution inside the group 1 and load distribution inside the group 2 can be separately performed. For this purpose, a threshold serving as a reference for the load distribution inside the group and a threshold serving as a reference for the intragroup load distribution can be separately set.

In the above description, a method for classifying multi-carriers into a plurality of groups and performing load equalization inside a group, offloading inside a group, and intragroup offloading has been described. However, the present invention is also applicable to a wireless communication system supporting a single carrier by classifying a plurality of cells into groups.

The present invention divides multi-carriers into a plurality of groups in a wireless communication system supporting the multi-carriers, allows each base station to measure cell load information of a serving cell and a neighbor cell, and perform load distribution for co-located multi-carriers inside a group, load distribution for multi-carriers of a different position inside a group, or load distribution for multi-carriers of different groups based on the measured cell load information, so that efficient load distribution can be possible depending on a company policy.

Although the invention has been shown and described with reference to certain embodiments thereof, it will be understood by those skilled in the art that various changes in form and details may be made therein without departing from the spirit and scope of the invention as defined by the appended claims and their equivalents. Therefore, the scope of the present invention should not be limited to the above-described embodiments but should be determined by not only the appended claims but also the equivalents thereof.

What is claimed is:

1. A method for distributing a load of a base station in a wireless communication system supporting multi-carriers, the method comprising:
   classifying a plurality of carriers into a plurality of groups;
   determining a load of each of a plurality of cells corresponding to the plurality of carriers;
   determining a source cell requiring a load distribution among the plurality of cells, based on the determined load of each cell;
   comparing a load of the source cell with a plurality of thresholds;
   determining at least one target group from among a plurality of groups, based on the comparing result;
   determining at least one target cell from among a plurality of cells of the determined at least one target group, based on the comparing result; and
   distributing the load of the source cell to the at least one target cell,
   wherein the plurality of thresholds comprises a first threshold, a second threshold, and a third threshold,
   wherein the first threshold is used for determining whether to select at least one target cell from co-located cells among all cells inside a group to which a carrier of the source cell belongs,
   wherein the second threshold is used for determining whether to select at least one target cell among the all cells inside the group to which the carrier of the source cell belongs,
   wherein the third threshold is used for determining whether to select at least one target cell among cells inside a different group to which the carrier of the source cell does not belongs,
   wherein the load is calculated using at least one of an air resource not in use, an air resource allocatable to a user equipment (UE) which indicates an amount of the air resource, if available air resources for non-guaranteed bit rate (non-GBR) services are equally allocated to future UEs and existing UEs, a number of connected UEs, a maximum number of allowable connected UEs per cell, a hardware load, a backhaul average unused amount, a backhaul average use amount for non-GBR services, and a backhaul available amount for the non-GBR services, and
   wherein the future UEs are UEs which will newly enter a cell.

2. The method of claim 1, wherein classifying the plurality of carriers into the plurality of groups comprises:
   classifying the plurality of carriers into the plurality of groups using at least one of a purpose for each carrier, a company code for each carrier, and a company policy for each carrier.

3. The method of claim 1, wherein determining the at least one target cell from among the plurality of cells of the determined at least one target group, based on the comparing result comprises:
   if the load of the source cell is greater than or equal to the first threshold and less than the second threshold, selecting the at least one target cell from the co-located cells among the all cells inside the group to which the carrier of the source cell belongs; and
   if the load of the source cell is greater than or equal to the second threshold, selecting the at least one target cell among the all cells inside the group to which the carrier of the source cell belongs.

4. The method of claim 3, wherein selecting the at least one target cell from the co-located cells among the all cells inside the group to which the carrier of the source cell belongs comprises:
   if a plurality of co-located cells exist among the all cells inside the group to which the carrier of the source cell belongs, calculating a difference value between a load of each of the plurality of co-located cells and the load of the source cell; and selecting a co-located cell where the difference value is greater than a threshold difference value set in advance.

5. The method of claim 3, wherein selecting the at least one target cell among the all cells inside the group to which the carrier of the source cell belongs comprises:
   if a plurality of cells neighboring the source cell exist among the all cells inside the group to which the carrier of the source cell belongs, selecting a cell having a load less than an object load set in advance among the plurality of neighbor cells.

6. The method of claim 5, further comprising, when a plurality of cells having the load less than the object load set in advance exist among the plurality of neighbor cells, selecting at least one cell among all cells having the load less than the object load based on an absolute cell capacity of each cell, wherein the absolute cell capacity is calculated using at least one of a frequency bandwidth of a relevant cell, an available time, an absolute resource of a cell having a largest air resource among all cells on which load distribution is to be performed, and a representative available resource,
   wherein the representative available resource is calculated using at least one of an air resource not in use, an air resource allocatable to a User Equipment (UE), which indicates an amount of the air resource, if the available air resources for non-GBR services are equally allocated to future UEs and existing UEs, a number of connected UEs, a maximum number of allowable connected UEs per cell, a hardware load, a backhaul average unused amount, a backhaul average use amount for non-GBR services, and a backhaul available amount for the non-GBR services, and
   wherein the future UEs are UEs which will newly enter a cell.

7. The method of claim 3,
   wherein determining at least one target cell from among the plurality of cells of the determined at least one target group, based on the comparing result comprises:
   if the load of the source cell is greater than or equal to the third threshold, selecting a cell neighboring the source cell among all cells inside the different group to which the carrier of the source cell does not belong.

8. The method of claim 7, wherein selecting the cell neighboring the source cell among all cells inside the different group to which the carrier of the source cell does not belong comprises:
   when a plurality of cells neighboring the source cell exist among all cells inside the different group, selecting a cell having a load less than an object load set in advance among the plurality of neighbor cells.

9. The method of claim 8, further comprising, when a plurality of cells having a load less than the object load set in advance exist among the plurality of neighbor cells, selecting at least one cell among the cells having the load less than the object load based on an absolute cell capacity of each cell, wherein the absolute cell capacity is calculated using at least one of a frequency bandwidth of a relevant cell, an available time, an absolute resource of a cell having a largest air resource among all cells on which load distribution is to be performed, and a representative available resource.

10. An apparatus for distributing a load of a base station in a wireless communication system supporting multi-carriers, the apparatus comprising:
   a transceiver for transmitting/receiving a signal comprising load information; and
   a controller for controlling functions for classifying a plurality of carriers into a plurality of groups, determining a load of each of a plurality of cells corresponding to the plurality of carriers, determining a source cell requiring a load distribution among the plurality of cells, based on the determined load of each cell, comparing a load of the source cell with a plurality of thresholds, determining at least one target group from among a plurality of groups, based on the comparing result, determining at least one target cell from among a plurality of cells of the determined at least one target group, based on the comparing result, and distributing the load of the source cell to the at least one target cell,
   wherein the plurality of thresholds comprises a first threshold, a second threshold, and a third threshold,
   wherein the first threshold is used for determining whether to select at least one target cell from co-located cells among all cells inside a group to which a carrier of the source cell belongs,
   wherein the second threshold is used for determining whether to select at least one target cell among the all cells inside the group to which the carrier of the source cell belongs,
   wherein the third threshold is used for determining whether to select at least one target cell among cells inside a different group to which the carrier of the source cell does not belongs,
   wherein the load is calculated using at least one of an air resource not in use, an air resource allocatable to a user equipment (UE) which indicates an amount of the air resource, if available air resources for non-guaranteed bit rate (non-GBR) services are equally allocated to future UEs and existing UEs, a number of connected UEs, a maximum number of allowable connected UEs per cell, a hardware load, a backhaul average unused amount, a backhaul average use amount for non-GBR services, and a backhaul available amount for the non-GBR services, and
   wherein the future UEs are UEs which will newly enter a cell.

11. The apparatus of claim 10, wherein the controller classifies the plurality of carriers into the plurality of groups using at least one of a purpose for each carrier, a company code for each carrier, and a company policy for each carrier.

12. The apparatus of claim 10, wherein,
   if the load of the source cell is greater than or equal to the first threshold and less than the second threshold, the controller selects the at least one target cell from the co-located cells among the all cells inside the group to which the carrier of the source cell belongs, and
   if the cell load of the source cell is greater than or equal to the second threshold and less than the third threshold, the controller selects the at least one target cell among the all cells inside the group to which the carrier of the source cell belongs.

13. The apparatus of claim 12, wherein if the load of the source cell is greater than or equal to the third threshold, the controller selects a cell neighboring the source cell among the all cells inside the different group to which the carrier of the source cell does not belong.

14. The apparatus of claim 13, wherein when a plurality of cells neighboring the source cell exist among all cells inside the different group, the controller selects a cell having a load less than an object load set in advance among the plurality of neighbor cells.

15. The apparatus of claim 14, wherein when a plurality of cells having a load less than the object load set in advance exist among the plurality of neighbor cells, the controller selects at least one cell among the cells having the load less than the object load based on an absolute cell capacity of each cell, and wherein the absolute cell capacity is calculated using at least one of a frequency bandwidth of a relevant cell, an available time, an absolute resource of a cell having a largest air resource among all cells on which load distribution is to be performed, and a representative available resource.

16. The apparatus of claim 12, wherein if a plurality of cells neighboring the source cell exist among the all cells inside the group to which the carrier of the source cell belongs, the controller selects a cell having a load less than an object load set in advance among the plurality of neighbor cells.

17. The apparatus of claim 16, wherein when a plurality of cells having the load less than the object load set in advance exist among the plurality of neighbor cells, the controller selects at least one cell among all cells having the load less than the object load based on an absolute cell capacity of each cell, wherein the absolute cell capacity is calculated using at least one of a frequency bandwidth of a relevant cell, an available time, an absolute resource of a cell having a largest air resource among all cells on which load distribution is to be performed, and a representative available resource, wherein the representative available resource is calculated using at least one of an air resource not in use, an air resource allocatable to a User Equipment (UE) which indicates the amount of the air resource if the available air resources for non-GBR services are equally allocated to future UEs and existing UEs, the number of connected UEs, a maximum number of allowable connected UEs per cell, a hardware load, a backhaul average unused amount, a backhaul average use amount for non-GBR services, and a backhaul available amount for non-GBR services, and wherein the future UEs are UEs which will newly enter the relevant cell.

18. The apparatus of claim 10, wherein if a plurality of co-located cells exist among the all cells inside the group to which the carrier of the source cell belongs, the controller calculates a difference value between a load of each of the plurality of co-located cells and the load of the source cell, and selects a co-located cell where the difference value is greater than a threshold difference value set in advance.

* * * * *